US009792127B2

(12) United States Patent
Masuyama et al.

(10) Patent No.: US 9,792,127 B2
(45) Date of Patent: *Oct. 17, 2017

(54) INFORMATION PROCESSING SYSTEM WHEREIN A REBOOT PROCESS OF A FIRST OF TWO DEVICES IS CONTROLLED INDEPENDENTLY OF AN IMAGE FORMING PROCESS, INFORMATION PROCESSING METHOD, AND COMPUTER-READABLE STORAGE MEDIUM

(71) Applicant: Ricoh Company, Ltd., Ohta-ku, Tokyo (JP)

(72) Inventors: Yoh Masuyama, Kanagawa (JP); Tadashi Nagata, Kanagawa (JP); Keisuke Iwasa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,523

(22) Filed: May 31, 2016

(65) Prior Publication Data
US 2016/0274919 A1  Sep. 22, 2016

Related U.S. Application Data

(63) Continuation of application No. 14/283,348, filed on May 21, 2014, now Pat. No. 9,377,829.

(30) Foreign Application Priority Data

Jun. 7, 2013  (JP) .................................. 2013-121286

(51) Int. Cl.
G06F 9/00 (2006.01)
G06F 9/44 (2006.01)
(Continued)

(52) U.S. Cl.
CPC .............. *G06F 9/4406* (2013.01); *G06F 1/24* (2013.01); *G06F 9/4403* (2013.01);
(Continued)

(58) Field of Classification Search
CPC ..... G06F 9/4401; G06F 9/4416; G06F 9/4443
(Continued)

(56) References Cited

U.S. PATENT DOCUMENTS 5,546,538 A   8/1996 Cobbley et al.
6,163,343 A * 12/2000 Jung ...................... H04N 17/04
                                                  348/515
(Continued)

FOREIGN PATENT DOCUMENTS

JP   2004-152010 A   5/2004
JP   2005-219247 A   8/2005
(Continued)

Primary Examiner — Chun Cao
(74) Attorney, Agent, or Firm — Harness, Dickey & Pierce, P.L.C.

(57) ABSTRACT

An information processing system includes an operating unit that receives an input in response to a user operation and that runs under a first operating system; and a main body that runs under a second operating system and operates in response to the input received by the operating unit. The main body includes a generation unit that generates a command to direct rendering of a screen corresponding to an application being executed, and a command transmission control unit that provides control to transmit the command to the operating unit. The operating unit includes a receiving unit that receives the command from the main body, a screen rendering unit that renders the screen in accordance with the command received by the receiving unit, a display unit that displays the screen rendered by the screen rendering unit, and a reboot unit that reboots the operating unit in asynchronization with the main body.

21 Claims, 6 Drawing Sheets

(51) Int. Cl.
*G06F 1/24* (2006.01)
*H04N 1/00* (2006.01)
*H04N 1/32* (2006.01)

(52) U.S. Cl.
CPC .......... *G06F 9/4416* (2013.01); *G06F 9/4443* (2013.01); *H04N 1/00928* (2013.01); *H04N 1/32667* (2013.01); *G06F 9/4401* (2013.01); *H04N 2201/0094* (2013.01)

(58) Field of Classification Search
USPC ........................................................ 713/1, 2
See application file for complete search history.

(56) References Cited

U.S. PATENT DOCUMENTS

| | | | |
|---|---|---|---|
| 6,745,334 B1* | 6/2004 | Ikegami | H04N 1/32122 358/1.6 |
| 6,938,174 B2 | 8/2005 | LeKuch et al. | |
| 8,418,065 B2 | 4/2013 | Conley et al. | |
| 8,438,632 B2 | 5/2013 | Kanou et al. | |
| 9,377,829 B2* | 6/2016 | Masuyama | G06F 1/24 |
| 2002/0054281 A1* | 5/2002 | Yamada | G03B 27/42 355/53 |
| 2004/0022548 A1 | 2/2004 | Nagaoka | |
| 2005/0179931 A1 | 8/2005 | Yamaguchi et al. | |
| 2009/0316206 A1 | 12/2009 | Anezaki et al. | |
| 2010/0046038 A1 | 2/2010 | Matsuda et al. | |

FOREIGN PATENT DOCUMENTS

| | | |
|---|---|---|
| JP | 2009-100419 A | 5/2009 |
| JP | 2009-296357 A | 12/2009 |
| JP | 4666013 B2 | 4/2011 |

* cited by examiner

INFORMATION PROCESSING SYSTEM WHEREIN A REBOOT PROCESS OF A FIRST OF TWO DEVICES IS CONTROLLED INDEPENDENTLY OF AN IMAGE FORMING PROCESS, INFORMATION PROCESSING METHOD, AND COMPUTER-READABLE STORAGE MEDIUM

CROSS-REFERENCE TO RELATED APPLICATION

This application is a continuation application of and claims priority under 35 U.S.C. §120/121 to U.S. application Ser. No. 14/283,348 filed May 21, 2014, which claims priority under 35 U.S.C. §119 to Japanese Patent Application No. 2013-121286, filed on Jun. 7, 2013, in the Japan Patent Office, the entire contents of each of which are hereby incorporated by reference herein.

BACKGROUND OF THE INVENTION

1. Field of the Invention

The present invention relates to an information processing system, an information processing method, and a computer-readable storage medium.

2. Description of the Related Art

A configuration which implements an automatic reboot (restart) of a device in the event of a failure of the device has been conventionally known (for example, Japanese Laid-open Patent Publication No. 2004-152010 and Japanese Patent Application Laid-Open No. 2005-219247).

However, for example, there is a problem in association with the conventional technique in that the main device body is automatically rebooted even when an error (abnormality) which has no effect on a currently running job occurs, with the result that the running job is not assured.

Therefore, there is a need to provide an information processing system, an information processing method, and a computer-readable storage medium which are capable of ensuring that a job is not affected by an error that has occurred.

SUMMARY OF THE INVENTION

It is an object of the present invention to at least partially solve the problems in the conventional technology.

According to an embodiment, there is provided an information processing system that includes an operating unit that receives an input in response to a user operation, the operating unit running under a first operating system; and a main body that runs under a second operating system and operates in response to the input received by the operating unit. The main body includes a generation unit that generates a command to direct rendering of a screen corresponding to an application being executed, and a command transmission control unit that provides control to transmit the command to the operating unit. The operating unit includes a receiving unit that receives the command from the main body, a screen rendering unit that renders the screen in accordance with the command received by the receiving unit, a display unit that displays the screen rendered by the screen rendering unit, and a reboot unit that reboots only the operating unit in asynchronization with the main body.

According to another embodiment, there is provided an information processing method to be executed by an operating unit that receives an input in response to a user operation and is connected to a main body, the operating unit running under a first operating system, the main body running under a second operating system and operating in response to the input. The information processing method includes receiving from the main body a command to direct rendering of a screen corresponding to an application being executed in the main body; rendering the screen in accordance with the command received at the receiving; displaying the screen rendered at the rendering; and rebooting only the operating unit in asynchronization with the main body.

According to still another embodiment, there is provided a non-transitory computer-readable storage medium with an executable program stored thereon and executed by a computer of an operating unit that receives an input in response to a user operation and is connected to a main body, the operating unit running under a first operating system, the main body running under a second operating system and operating in response to the input. The program instructs the computer to perform receiving from the main body a command to direct rendering of a screen corresponding to an application being executed in the main body; rendering the screen in accordance with the command received at the receiving; displaying the screen rendered at the rendering; and rebooting only the operating unit in asynchronization with the main body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing system according to the present invention will be described in detail below with reference to the accompanying drawings. Hereinbelow, an example in which an information processing system according to the present invention is applied to a multifunction peripheral (MFP) will be described. However, the invention is not limited thereto. Note that the multifunction peripheral has at least two functions of a print function, a copy function, a scanner function, and a facsimile function.

First Embodiment

Figure 1:
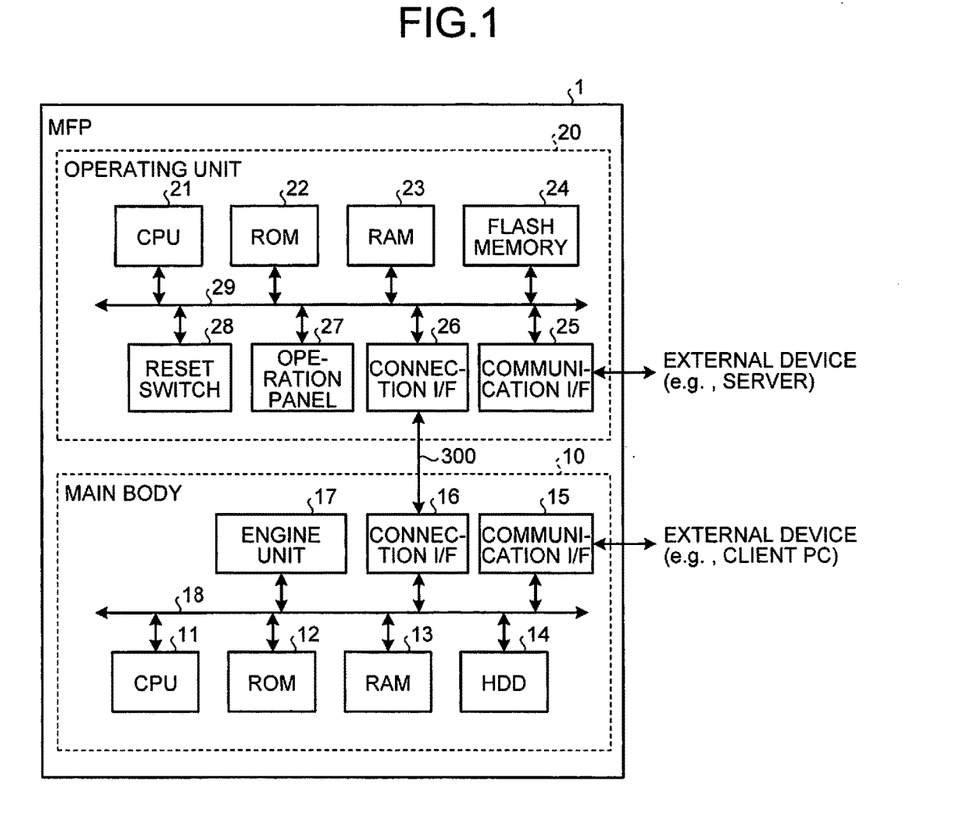
FIG. 1 is a diagram illustrating a hardware configuration example of an MFP.

FIG. 1 is a block diagram illustrating a hardware configuration example of an MFP 1 of the present embodiment.

As illustrated in FIG. 1, the MFP 1 includes a main body 10 which can implement various types of functions such as a copy function, a scanner function, a facsimile function, and a printer function, and an operating unit 20 for receiving an input in response to a user operation. The main body 10 and the operating unit 20 are connected so as to be capable of communicating with each other through a dedicated communication channel 300. The communication channel 300 to be employed can be, for example, of the Universal Serial Bus (USB) standard, but may also be of any standard, wired or wireless.

Note that the main body 10 can operate in response to an input received by the operating unit 20. Furthermore, the main body 10 can communicate with an external device such as a client personal computer (PC) and thus also operate in response to a command received from an external device.

A description will next be made to the hardware configuration of the main body 10. As illustrated in FIG. 1, the main body 10 includes a CPU 11, a ROM 12, a RAM 13, a hard disk drive (HDD) 14, a communication interface (I/F) 15, a connection I/F 16, and an engine unit 17, which are connected to each other through a system bus 18.

The CPU 11 provides centralized control to the operation of the main body 10. The CPU 11 executes programs stored, for example, in the ROM 12 or the HDD 14 with the RAM 13 employed as a work area, and thereby provides control to the operation of the entire main body 10 so as to implement the aforementioned various types of functions such as a copy function, a scanner function, a facsimile function, and a printer function.

The communication I/F 15 is an interface for communicating with an external device such as the client personal computer (PC). The connection I/F 16 is an interface for communicating with the operating unit 20 through the communication channel 300.

The engine unit 17 is a hardware component for performing processing other than general-purpose information processing and communications in order to implement a copy function, a scanner function, a facsimile function, and a printer function. For example, the engine unit 17 includes a scanner (an image reading unit) for scanning and reading an image of a document, a plotter (an image forming unit) for printing on a sheet material such as a sheet of paper, and a facsimile unit for performing facsimile communications. Furthermore, the engine unit 17 may also include a specific optional component such as a finisher for sorting printed sheet materials or an automatic document feeder (ADF) for automatically feeding documents.

A description will next be made to the hardware configuration of the operating unit 20. As illustrated in FIG. 1, the operating unit 20 includes a CPU 21, a ROM 22, a RAM 23, a flash memory 24, a communication I/F 25, a connection I/F 26, an operation panel 27, and a reset switch 28, which are connected to each other through a system bus 29.

The CPU 21 provides centralized control to the operation of the operating unit 20. The CPU 21 executes programs stored, for example, in the ROM 22 or the flash memory 24 with the RAM 23 employed as a work area, thereby providing control to the operation of the entire operating unit 20 so as to implement various types of functions, to be discussed later, such as the function of displaying information (images) in response to an input received from a user.

The communication I/F 25 is an interface for communicating with an external device such as a server through a network, for example, the Internet. The connection I/F 26 is an interface for communicating with the main body 10 through the communication channel 300.

The operation panel 27 receives various types of inputs in response to a user operation and displays various types of pieces of information (for example, information indicative of an operational status of the MFP 1 or information indicative of a setting status). In this example, the operation panel 27 is a liquid crystal display device (LCD) having a touch panel function. However, the invention is not limited thereto. For example, the operation panel 27 may also be an organic EL display device which incorporates a touch panel function. Furthermore, in addition to or in place of this, it is also possible to provide an operating unit such as a hardware key or a display unit such as a lamp.

The reset switch 28 is an operating device which is used to input a command to execute a reboot (restart) of only the operating unit 20. In this example, when a user depresses the reset switch 28, a command to execute a reboot of only the operating unit 20 is entered. However, such an operating device is not limited to the reset switch 28.

Figure 2:
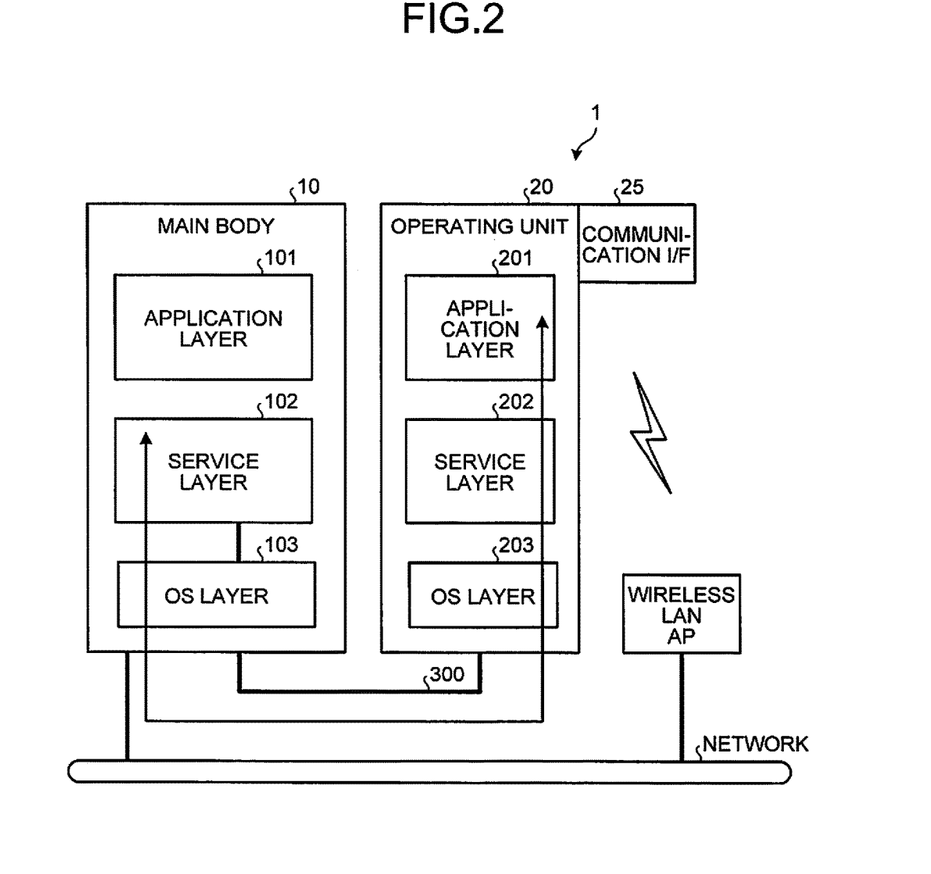
FIG. 2 is a diagram illustrating a software configuration example of the MFP.

A description will next be made to the software configuration of the MFP 1. FIG. 2 is a schematic diagram illustrating an example of the software configuration of the MFP 1. As illustrated in FIG. 2, the main body 10 has an application layer 101, a service layer 102, and an OS layer 103. The entities of the application layer 101, the service layer 102, and the OS layer 103 are various types of software which are stored, for example, in the ROM 12 or the HDD 14. The CPU 11 executes these pieces of software, thereby providing various types of functions.

The software of the application layer 101 is application software (which may also be referred to simply as an "application" hereinafter) for operating hardware resources to provide a predetermined function. For example, the types of applications may include a copy application for providing a copy function, a scanner application for providing a scanner function, a facsimile application for providing a facsimile function, and a printer application for providing a printer function.

The software of the service layer 102 is interposed between the application layer 101 and the OS layer 103 so as to provide an interface for using a hardware resource included in the main body 10. More specifically, the software provides functions for reception of a request to operate a hardware resource and for arbitration of an operation request. It may be conceivable that the operation request received by the service layer 102 is a request to read by a scanner or print by a plotter.

Note that the interface function by the service layer 102 is provided not only to the application layer 101 of the main body 10 but also to an application layer 201 of the operating unit 20. That is, the application layer 201 (application) of the operating unit 20 can implement a function using a hardware resource (for example, the engine unit 17) of the main body 10 through the interface function of the service layer 102.

The software of the OS layer 103 is the basic software (operating system) that provides a basic function for controlling the hardware included in the main body 10. The software of the service layer 102 converts a request to use a hardware resource from various types of applications to a command that can be interpreted by the OS layer 103, and then passes the command to the OS layer 103. Then, the software of the OS layer 103 executes the command, thereby allowing the hardware resource to operate in accordance with the request of the application.

Likewise, the operating unit 20 has the application layer 201, a service layer 202, and an OS layer 203. The application layer 201, the service layer 202, and the OS layer 203 included in the operating unit 20 also have the same hierarchical structure as that of the main body 10. However, the function provided by the application of the application layer 201 and the type of the operation request that can be received by the service layer 202 are different from those of the main body 10. Applications of the application layer 201 may be such pieces of software that operate the hardware resources included in the operating unit 20 so as to provide a predetermined function, but may mainly include pieces of software for providing a user interface (UI) function of operating or displaying the functions (a copy function, a scanner function, a facsimile function, and a printer function) included in the main body 10.

Note that in the present embodiment, to ensure the independency of the functions, the software of the OS layer 103 of the main body 10 and the software of the OS layer 203 of the operating unit 20 are different from each other. That is, the main body 10 and the operating unit 20 operate on different operating systems independently of each other. For example, it is also possible to employ Linux (registered trademark) as the software of the OS layer 103 of the main body 10 and Android (registered trademark) as the software of the OS layer 203 of the operating unit 20.

Furthermore, in the present embodiment, since power is supplied to the operating unit 20 through the communication channel 300 from the main body 10, control on the power supply of the operating unit 20 can be provided separately from (independently of) the control on the power supply of the main body 10.

Figure 3:
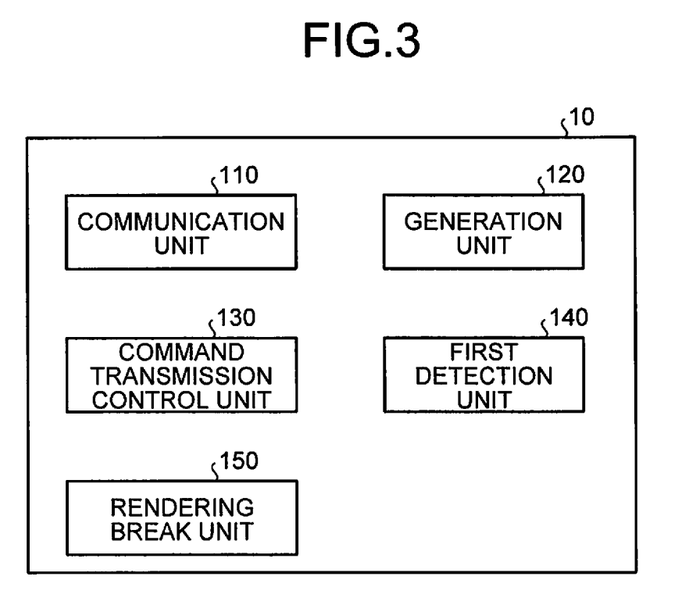
FIG. 3 is a diagram illustrating a functional configuration example of the main body.
Figure 4:
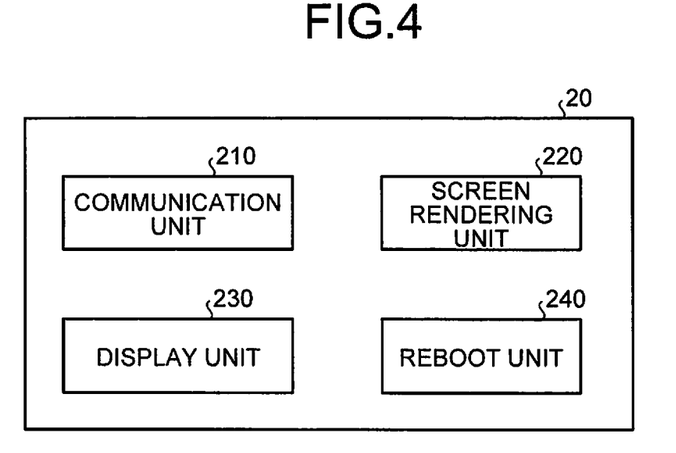
FIG. 4 is a view illustrating a functional configuration example of an operating unit.

A description will next be made to the functional configuration of the MFP 1. FIG. 3 is a diagram illustrating a functional configuration example of the main body 10, and FIG. 4 is a diagram illustrating a functional configuration example of the operating unit 20. For convenience of description, FIGS. 3 and 4 mainly illustrate the functions according to the present invention. However, the functions of the MFP 1 are not limited thereto.

First, a description will be made to the function of the main body 10. As illustrated in FIG. 3, the main body 10 includes a communication unit 110, a generation unit 120, a command transmission control unit 130, a first detection unit 140, and a rendering break unit 150.

The communication unit 110 communicates with the operating unit 20 through the communication channel 300 mentioned above.

The generation unit 120 generates a rendering command for directing an application being executed to render a corresponding screen. Here, the "screen" refers to an image to be displayed on the operating unit 20 (the operation panel 27). Screens corresponding to applications may take various forms depending on the type of the application or the running status of the application. For example, when an application being executed is a printer application, a screen corresponding to the printer application being executed may be formed to include an image for notifying the current number of printed sheets.

The command transmission control unit 130 provides control to transmit a rendering command to the operating unit 20. More specifically, when the generation unit 120 generates a rendering command, the command transmission control unit 130 provides control to allow the communication unit 110 to transmit the generated rendering command to the operating unit 20.

The first detection unit 140 detects whether an abnormality has occurred in the communications with the operating unit 20. In the present embodiment, the first detection unit 140 can detect a USB being detached or a transmission control protocol (TCP) communication being disconnected.

When the first detection unit 140 has detected an abnormality, the rendering break unit 150 provides control (which may also be referred to as the "rendering break control") to reduce the rendering of a screen by the operating unit 20. In the present embodiment, when the first detection unit 140 has detected an abnormality, the rendering break unit 150 directs the generation unit 120 to stop generating the rendering command and as well directs the command transmission control unit 130 to discard the rendering command. Note that in the present embodiment, even when an abnormal communication event has occurred with the operating unit 20 (even when the first detection unit 140 has detected an abnormality), an application being executed (for example, a printer application) on the side of the main body 10 continues to operate without changes made thereto.

Furthermore, in the present embodiment, when the abnormality detected by the first detection unit 140 has been eliminated, the rendering break unit 150 releases the break of rendering a screen by the operating unit 20 (releases the rendering break control). More specifically, when the communication with the operating unit 20 has been recovered, the rendering break unit 150 directs the generation unit 120 to restart generation of a rendering command and as well directs the command transmission control unit 130 to restart transmission of a rendering command. Upon reception of the direction, the generation unit 120 generates the rendering command for directing the rendering of a screen depending on the current status of an application being executed, while the command transmission control unit 130 provides control so as to transmit the rendering command generated by the generation unit 120 to the operating unit 20.

For example, suppose that the application being executed on the side of the main body 10 is a printer application and the screen corresponding to the printer application being executed includes an image for notifying the current number of printed sheets. For example, when the first detection unit 140 detects an abnormality at the current number of printed sheets of "20", the printer application being executed continues operating without changes made thereto. However, the aforementioned rendering break control causes the generation of the screen corresponding to the printer application being executed to be stopped, and the generated rendering command is discarded. Subsequently, when the abnormality detected by the first detection unit 140 is eliminated, the rendering break unit 150 directs the generation unit 120 to restart generation of a rendering command. When the number of printed sheets is "50" at the point in time at which this direction was received, the generation unit 120 is configured to generate a rendering command for directing, as a screen depending on the current status of the printer application being executed, rendering of a screen including an image to notify that the current number of printed sheets is "50".

The function of each of the communication unit 110, the generation unit 120, the command transmission control unit 130, the first detection unit 140, and the rendering break unit 150, which were described above, is implemented by the CPU 11 executing programs stored in the ROM 12 or the HDD 14 with the RAM 13 employed as a work area; however, the invention is not limited thereto. For example, at least part of the functions of the aforementioned respective units of the main body 10 may also be implemented by a dedicated hardware circuit (for example, a semiconductor integrated circuit).

A description will now be made to the function of the operating unit 20. As illustrated in FIG. 4, the operating unit 20 includes a communication unit 210, a screen rendering unit 220, a display unit 230, and a reboot unit 240.

The communication unit 210 communicates with the main body 10 through the aforementioned communication channel 300. For example, the communication unit 210 can also receive the rendering command transmitted from the main body 10. The communication unit 210 may be referred to as a "receiving unit".

The screen rendering unit 220 renders a screen in accordance with a rendering command received from the main body 10. The display unit 230 displays the screen rendered by the screen rendering unit 220. More specifically, the display unit 230 provides control so as to display the screen rendered by the screen rendering unit 220 on the operation panel 27.

The reboot unit 240 reboots only the operating unit 20 in asynchronization with the main body 10. In the present embodiment, when having received an input to command execution of a reboot of only the operating unit 20 in response to a user operation on the reset switch 28, the reboot unit 240 reboots only the operating unit 20. More specifically, when the user depresses the reset switch 28, a command to execute a reboot of only the operating unit 20 is entered. Then, upon reception of the input of the execution command, the reboot unit 240 executes a reboot of only the operating unit 20.

The function of each of the communication unit 210, the screen rendering unit 220, the display unit 230, and the reboot unit 240, which were described above, is implemented by the CPU 21 executing programs stored in the ROM 22 or the flash memory 24 with the RAM 23 employed as a work area. However, the invention is not limited thereto. For example, at least part of the functions of the aforementioned respective units of the operating unit 20 may also be implemented by a dedicated hardware circuit (for example, a semiconductor integrated circuit).

Figure 5:
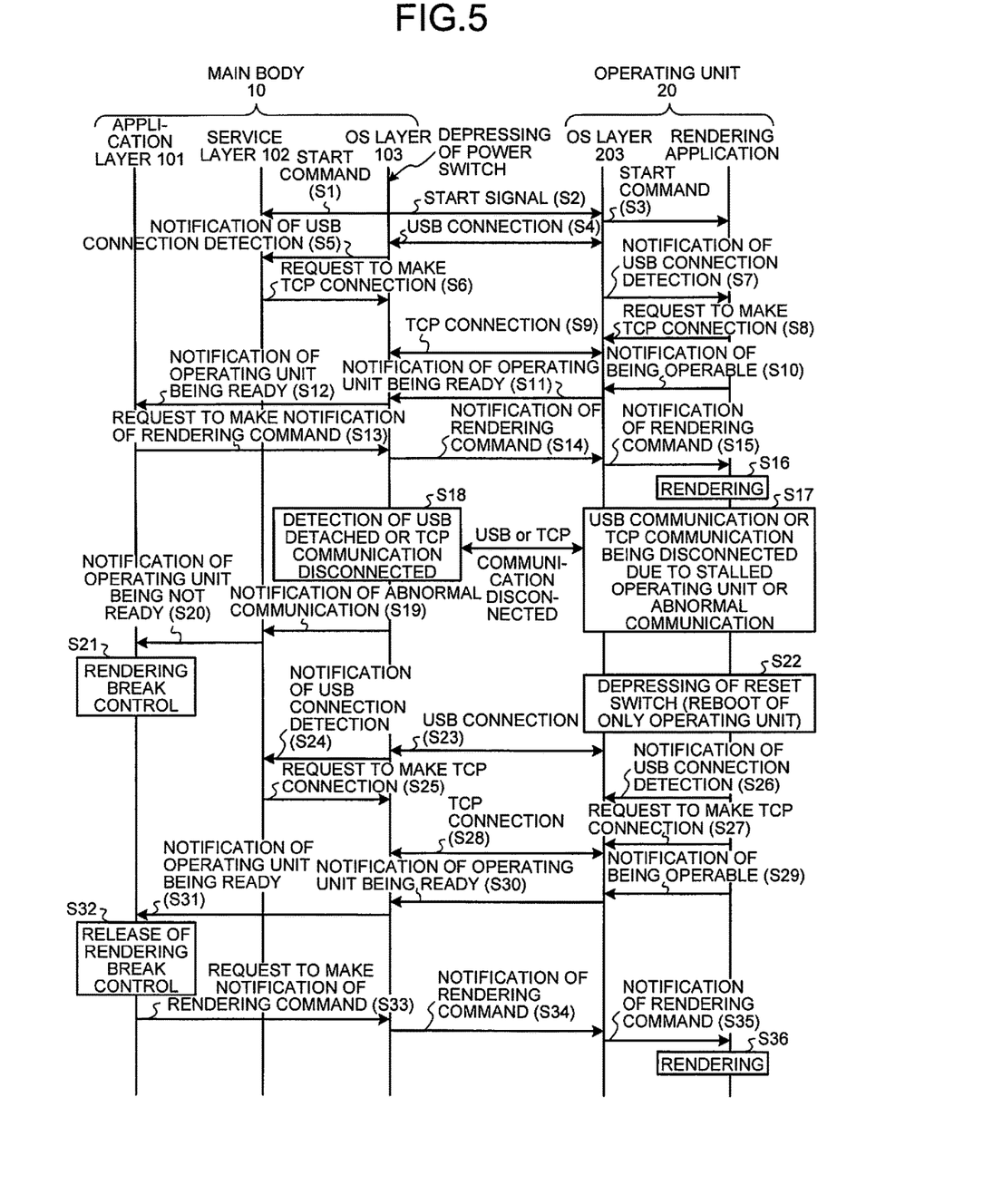
FIG. 5 is a sequence diagram illustrating an example of an operational procedure of the MFP.

A description will now be made to an exemplary operation of the MFP 1 according to the present embodiment. FIG. 5 is a sequence diagram illustrating an example of an operational procedure of the MFP 1 according to the present embodiment. Note that the "rendering application" of the operating unit 20 illustrated in FIG. 5 can also be understood to correspond to the aforementioned screen rendering unit 220. For convenience of description, in FIG. 5, the service layer 202 of the operating unit 20 or other applications are omitted and thus not illustrated.

First, when a user depresses a power switch (not illustrated), power starts to be supplied to the MFP 1 so as to start the OS layer 103 of the main body 10. The OS layer 103 that has been started outputs a start command to the service layer 102 (step S1). Furthermore, the OS layer 103 that has been started outputs a start signal to the OS layer 203 of the operating unit 20 (step S2). Note that in this example, the OS layer 203 of the operating unit 20 is started by receiving the start signal from the OS layer 103 of the main body 10. However, the invention is not limited thereto. For example, the OS layer 203 of the operating unit 20 may also be started when being supplied with the power that starts to be supplied by depressing the power switch.

The OS layer 203 of the operating unit 20 that has been started by receiving the start signal from the main body 10 outputs a start command to a rendering application (step S3). Next, a USB connection between the OS layer 103 of the main body 10 and the OS layer 203 of the operating unit 20 is established (step S4). Upon detection of a USB connection established, the OS layer 103 of the main body 10 notifies the service layer 102 of that event (step S5). The service layer 102 that has received this notification requests the OS layer 103 to make a TCP connection (step S6). Furthermore, upon detection of a USB connection established, the OS layer 203 of the operating unit 20 notifies the rendering application of this event (step S7). The rendering application that has received this notification requests the OS layer 203 to make a TCP connection (step S8). Then, a TCP connection between the OS layer 103 of the main body 10 and the OS layer 203 of the operating unit 20 is established (step S9).

When the rendering application that has been started by receiving the start command in step S3 above is in an operable state, the rendering application notifies the OS layer 203 of being operable (step S10). In the following descriptions, that the rendering application is in an operable state may also be referred to as "the operating unit being ready" and that the rendering application is in an inoperable state may also be referred to as "the operating unit being Not ready." The OS layer 203 that has received this notification notifies the OS layer 103 on the main body 10 side of the operating unit being ready (step S11). Then, the OS layer 103 of the main body 10 notifies the application layer 101 of the operating unit being ready (step S12).

The application layer 101 (the generation unit 120) that has received the notification of the operating unit being ready generates the aforementioned rendering command. Then, the application layer 101 (the command transmission control unit 130) requests the OS layer 103 to make a notification of the rendering command (step S13). The OS layer 103 that has received the request notifies the OS layer 203 on the operating unit 20 side of the rendering command (step S14). The OS layer 203 of the operating unit 20 notifies the rendering application of the rendering command transmitted from the main body 10 (step S15), and the rendering application renders a screen in accordance with the rendering command of which the rendering application was notified (step S16).

Thereafter, in the example of FIG. 5, it is assumed that the operating unit 20 will stall and the TCP communication or the USB communication will be disconnected due to an abnormal communication event or the like (step S17). When the USB communication or the TCP communication has been disconnected, the OS layer 103 of the main body 10 (the first detection unit 140) detects the USB being detached or the TCP communication being disconnected (step S18). Then, the OS layer 103 notifies the service layer 102 of the occurrence of an abnormality in the communications with the operating unit 20 (step S19). The service layer 102 that has received this notification notifies the application layer 101 of the operating unit being Not ready (step S20).

The application layer 101 (the rendering break unit 150) that has received the notification of the operating unit being Not ready provides the aforementioned rendering break control (step S21). More specifically, as described above, the rendering break unit 150 directs the generation unit 120 to stop generating the rendering command and as well directs the command transmission control unit 130 to discard the rendering command. On the other hand, since the screen displayed on the operating unit 20 (the operation panel 27) is in a frozen state with the screen being unchanged from immediately before the occurrence of the abnormality, the user glancing at this screen determines that some abnormality has occurred, and depresses the reset switch 28 (step S22). This action allows for entering a command to execute a reboot of only the operating unit 20, so that the reboot unit 240 that has received the input of the command to execute the reboot executes a reboot of only the operating unit 20.

Likewise the initial start, when the reboot of only the operating unit 20 has been completed, a USB connection and a TCP connection between the OS layer 103 of the main body 10 and the OS layer 203 of the operating unit 20 are established (step S23 to step S28).

Then, when the rendering application that has been restarted is in an operable state, the rendering application notifies the OS layer 203 that the rendering application is operable (step S29). The OS layer 203 that has received this notification notifies the OS layer 103 of the main body 10 of the operating unit being ready (step S30). Then, the OS layer 103 of the main body 10 notifies the application layer 101 of the operating unit being ready (step S31).

The application layer 101 (the rendering break unit 150) that has received the notification of the operating unit being ready in step S31 mentioned above releases the rendering break control (step S32). More specifically, as described above, the rendering break unit 150 directs the generation unit 120 to restart generation of a rendering command and as well directs the command transmission control unit 130 to restart transmission of a rendering command. The generation unit 120 that has received this direction generates a rendering command for directing rendering of a screen depending on the current status of an application being executed. Then, the command transmission control unit 130 requests the OS layer 103 to make a notification of the rendering command generated by the generation unit 120 (step S33). The OS layer 103 that has received this request notifies the OS layer 203 on the operating unit 20 side of the rendering command (step S34). The OS layer 203 of the operating unit 20 notifies the rendering application of the rendering command transmitted from the main body 10 (step S35), and the rendering application renders a screen in accordance with the rendering command of which the rendering application was notified (step S36). The rendering command that is notified at this time by the main body 10 directs to render a screen depending on the current status of the application being executed. It is thus possible to present a screen as a screen immediately after a reboot depending on the current status of the application being executed.

As described above, in the present embodiment, the operating unit 20 has the function (the reboot unit 240) for rebooting only the operating unit 20 asynchronously to the main body 10. Thus, for example, when the TCP communication or the USB communication is disconnected due to a stall of the operating unit 20 or an abnormal communication event or the like with the screen displayed on the operating unit 20 being in a frozen state, the user depresses the reset switch 28 to execute a reboot of only the operating unit 20. That is, since the power supply of the entire MFP 1 needs not to be turned OFF and the main body 10 is not rebooted in synchronization with the operating unit 20, it is possible to continue executing an application on the side of the main body 10 that is not affected by the abnormal communication event with the operating unit 20. That is, it is possible to ensure the job of the application on the side of the main body 10 that is not affected by the abnormality (error) that has occurred.

Furthermore, as described above, when an abnormality is detected in the communications with the operating unit 20, the rendering break unit 150 of the main body 10 provides control ("the rendering break control") so as to break rendering of a screen by the operating unit 20. Thus, when the abnormality in the communications with the operating unit 20 has been eliminated, it is possible to positively prevent an unnecessary rendering command from being notified to the operating unit 20.

Second Embodiment

Figure 6:
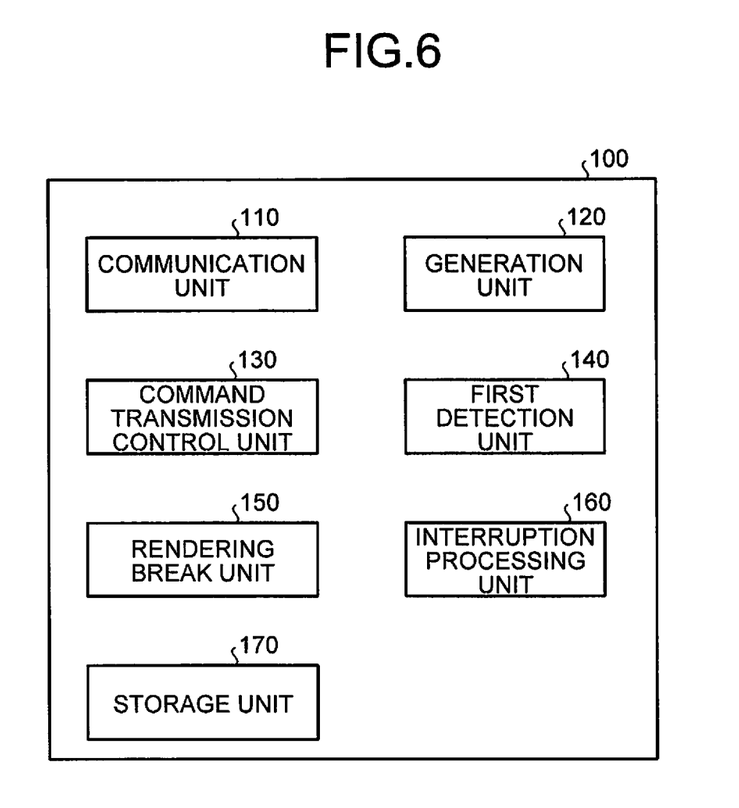
FIG. 6 is a diagram illustrating a functional configuration example of a main body according to a second embodiment.

A description will now be made to a second embodiment. In the following description, a main body according to the second embodiment is denoted as the "main body 100". The main body 100 according to the second embodiment is different from that of the aforementioned first embodiment in that the main body 100 further includes an interruption processing unit for performing interruption processing to interrupt the operation of an application being executed when the first detection unit 140 detects an abnormality. A description will next be made to specific contents. Note that descriptions of the contents that are common to those of the aforementioned first embodiment will be omitted as appropriate.

FIG. 6 is a diagram illustrating a functional configuration example of the main body 100. As illustrated in FIG. 6, the main body 100 further includes an interruption processing unit 160 and a storage unit 170. The storage unit 170 associates pieces of feasibility information, which are indicative of whether the interruption processing should be executed, with the type of applications and stores therein the resulting information.

When the first detection unit 140 detects an abnormality, the interruption processing unit 160 executes the interruption processing if the feasibility information corresponding to the application being executed indicates that the interruption processing should be executed. On the other hand, if the feasibility information corresponding to the application being executed indicates that the interruption processing should not be executed, the interruption processing unit 160 does not execute the interruption processing. More specifically, when the first detection unit 140 detects an abnormality, the interruption processing unit 160 reads the feasibility information which corresponds to the application being executed among the plurality of pieces of feasibility information stored in the storage unit 170. Then, the interruption processing unit 160 executes the interruption processing when the feasibility information that has been read indicates that the interruption processing should be executed. On the other hand, when the feasibility information having been read indicates that the interruption processing should not be executed, the interruption processing unit 160 does not execute the interruption processing.

Note that for example, it is also acceptable that the storage unit 170 is eliminated. In this configuration, when the first detection unit 140 detects an abnormality, the interruption processing unit 160 unconditionally executes the interruption processing irrespective of the type of the application being executed.

Figure 7:
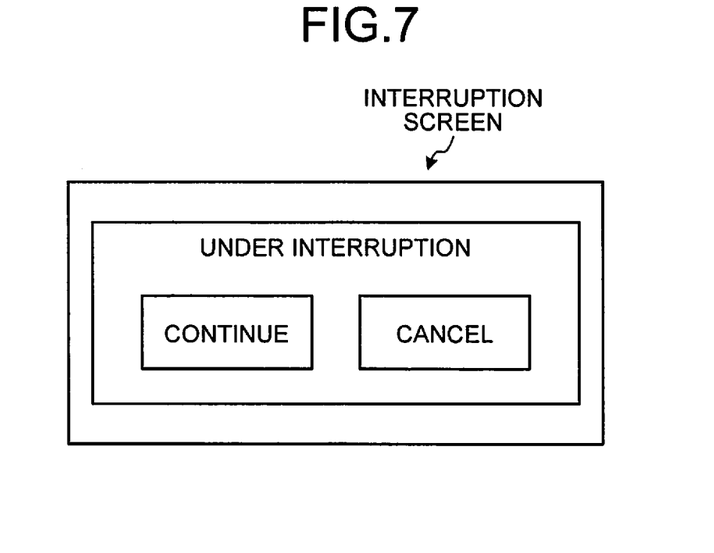
FIG. 7 is a diagram illustrating an example of an interruption screen.

Furthermore, in the present embodiment, when the abnormality detected by the first detection unit 140 has been eliminated while the aforementioned interruption processing is executed, the rendering break unit 150 releases the screen break control, and the generation unit 120 generates a rendering command for directing rendering of an interruption screen indicative of a screen which alarms that the operation of the application is under interruption. FIG. 7 is a view illustrating an example of the interruption screen. In the example of FIG. 7, the interruption screen includes an image for urging to select whether the operation of the application under interruption should be continued or cancelled in addition to an image indicating that the operation of the application is under interruption. In this example, the user having glanced at the interruption screen can select either that the operation of the application under interruption should be continued or cancelled. Upon reception of an input to select the continuation of the operation of the application under interruption, the main body 100 continues the operation of the application under interruption. On the other hand, upon reception of an input to select the cancel of the application under interruption, the main body 100 discards the execution of the application under interruption. Note that the form of the interruption screen is not limited to that of the example of FIG. 7. For example, the interruption screen may be formed so as not to include the image for urging to select whether the operation of the application under interruption should be continued or cancelled.

Figure 8:
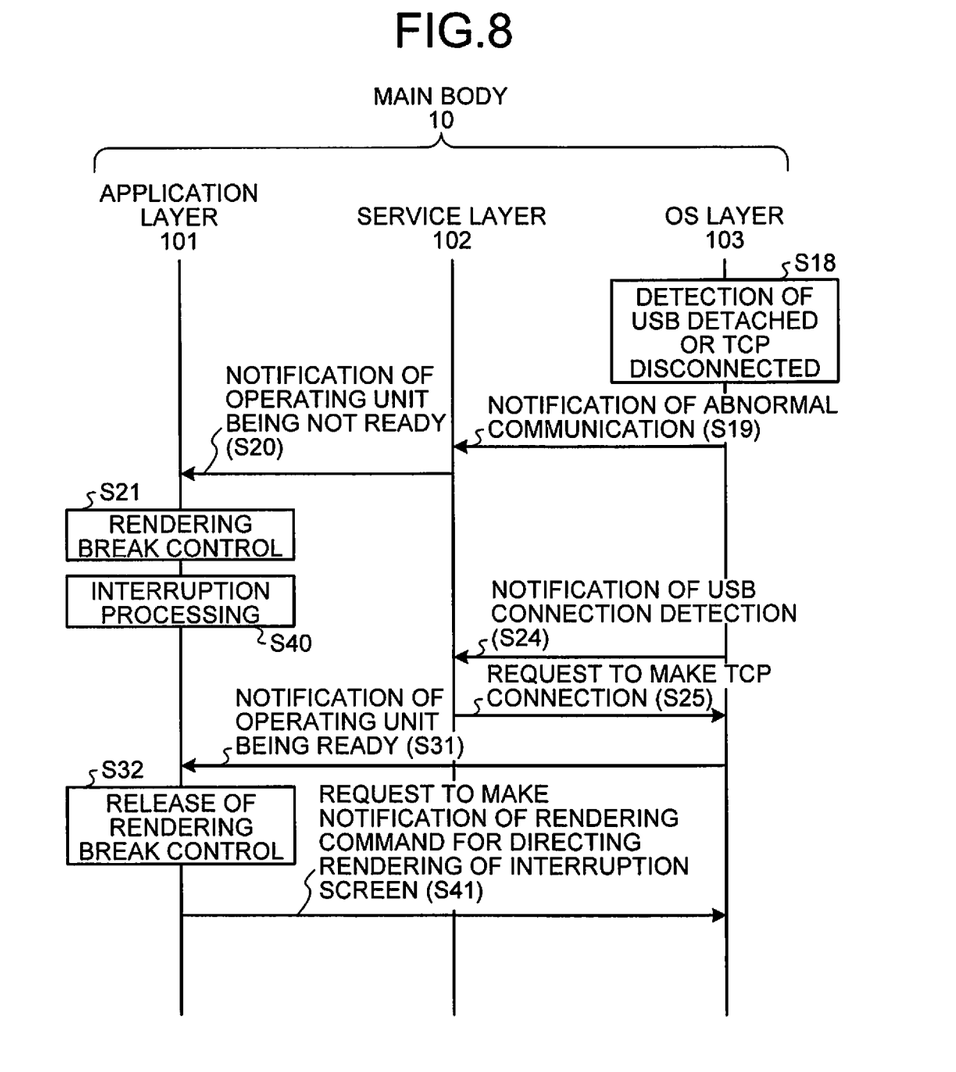
FIG. 8 is a sequence diagram illustrating an example of an operational procedure of an MFP according to the second embodiment.

A description will next be made to an exemplary operation of an MFP according to the present embodiment. FIG. 8 is a sequence diagram illustrating an example of the operational procedure of the MFP according to the present embodiment. In FIG. 8, the illustration of the parts which relate to other than the aforementioned interruption processing and which are commonly employed in the aforementioned first embodiment is appropriately omitted. A description will be made mainly to the parts relating to the interruption processing.

After the rendering break control in step S21 illustrated in FIG. 8 (having the same contents as those of step S21 illustrated in FIG. 5), the application layer 101 (the interruption processing unit 160) reads the feasibility information which corresponds to the application being executed among a plurality of pieces of feasibility information stored in the storage unit 170, and then determines whether to execute the interruption processing depending on the feasibility information that has been read. It is assumed in the example of FIG. 8 that the feasibility information corresponding to the application being executed indicates that the interruption processing should be executed, and thus the application layer 101 (the interruption processing unit 160) executes the interruption processing (step S40). After that, the flow down to step S32 (having the same contents as those of step S32 illustrated in FIG. 5) is the same as that of the aforementioned first embodiment.

In step S32 illustrated in FIG. 8, as in the aforementioned first embodiment, the application layer 101 (the rendering break unit 150) releases the rendering break control. More specifically, as described above, the rendering break unit 150 directs the generation unit 120 to restart generation of a rendering command and as well directs the command transmission control unit 130 to restart transmission of a rendering command. The generation unit 120 that has received this direction generates a rendering command to direct rendering of the interruption screen. Then, the command transmission control unit 130 requests the OS layer 103 to make a notification of the rendering command for directing the rendering of the interruption screen generated by the generation unit 120 (step S41). The OS layer 103 that has received this request notifies the OS layer 203 of the operating unit 20 of the rendering command (having the same contents as those of step S34 illustrated in FIG. 5), and the subsequent flow is the same as that of the aforementioned first embodiment.

For example, in each of the aforementioned embodiments, the reset switch 28 is depressed to trigger a reboot of only the operating unit 20 (the reboot is executed by manual control). However, the invention is not limited thereto. For example, the operating unit 20 may further include a second detection unit for detecting whether an abnormality occurs in the operating unit, and the reboot unit 240 may automatically execute a reboot of only the operating unit 20 when the second detection unit detects an abnormality. In such an embodiment, the aforementioned reset switch 28 is unnecessary.

Program

Programs executed in the MFP 1 of the aforementioned embodiments may be stored and provided, as an installable or executable file, on a computer readable recording medium such as a CD-ROM, a flexible disk (FD), a CD-R, a digital versatile disk (DVD), or a universal serial bus (USB) device, or may also be distributed and provided through a network such as the Internet. Furthermore, various types of programs may also be incorporated in advance in a ROM or the like and then provided.

According to the embodiments, it is possible to ensure that a job is not affected by an error that has occurred.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
a first device; and
a second device, wherein
the first device is separate from the second device and includes
a user interface including a display; and
a first processor configured to
receive a user operation for an image forming process via the user interface, and
control a reboot process for the first device independently of the image forming process,
the second device includes
a hardware device including at least a scanner or a printer; and
a second processor configured to
control the scanner or the printer to conduct the image forming process based on the received user operation, and
the first processor being configured to reboot the first device in asynchronization with the second device.

2. The image processing apparatus according to claim 1, wherein
the first device is configured to run under a first operating system, and
the second device is configured to run under a second operating system.

3. The image processing apparatus according to claim 2, wherein
the first operating system and the second operating system are different from each other.

4. The image processing apparatus according to claim 1, wherein
while the first processor reboots the first device, the second processor is configured to continue to operate the scanner or the printer.

5. The image processing apparatus according to claim 1, wherein
the second processor is configured to
send information corresponding to a status of executing the scanner or the printer to the first device, and
the first processor is configured to
receive the information, and
render a screen in accordance with the information.

6. The information processing apparatus according to claim 1, wherein
the second processor is configured to
generate a command to direct rendering of a screen corresponding to an application being executed in the second device, and
provide control to transmit the command to the first device, and wherein the first processor is configured to
receive the command, and
render the screen in accordance with the command, the display being configured to display the screen.

7. The information processing apparatus according to claim 6, wherein
the second device further includes
a sensor configured to
detect whether an abnormality occurs in a communication between the first device and the second device, and wherein
the second processor is configured to provide control to break rendering of the screen in the first device upon the second processor detecting the abnormality.

8. The information processing apparatus according to claim 7, wherein
the second processor is configured to
stop generating the command, and
discard the command upon the sensor detecting the abnormality.

9. The information processing apparatus according to claim 7, wherein
upon the abnormality being eliminated,
the second processor is configured to
release the break of rendering the screen in the first device, and
generate the command to direct rendering of a screen depending on a current status of an application being executed.

10. The information processing apparatus according to claim 7, wherein
the second processor is configured to perform interruption processing that interrupts an operation of an application being executed upon the sensor detecting the abnormality.

11. The information processing apparatus according to claim 10, wherein
the second device further includes a storage configured to store therein pieces of feasibility information indicative of whether the interruption processing is executed, in association with respective types of applications,
the second processor being configured to execute the interruption processing upon the sensor detecting the abnormality, the feasibility information for an application being executed indicating that the interruption processing is to be executed, and
the second processor being configured to not execute the interruption processing upon the sensor detecting the abnormality, the feasibility information for the application indicating that the interruption processing is not to be executed.

12. The information processing apparatus according to claim 10, wherein
upon the abnormality detected by the sensor being eliminated in a situation where the interruption processing is being executed,
the second processor is configured to
release the break of rendering the screen in the first device, and
generate the command to direct rendering of an interruption screen indicative of a screen that alarms that the operation of the application is under interruption.

13. The information processing apparatus according to claim 1, wherein
the first device further includes a switch used to input a command to execute a reboot of the first device, and
the first processor is configured to execute the reboot of the first device upon an input of the command to execute a reboot of the first device being received in response to a user operation on the switch.

14. The information processing apparatus according to claim 1, wherein
the first device further includes a sensor to detect whether an abnormality occurs in the first device, and
the first processor is configured to automatically execute a reboot of the first device when the sensor detects the abnormality.

15. An image processing system, comprising:
a first device; and
a second device configured to communicate with the first device through a communication channel, wherein
the first device is separate from the second device and includes
a user interface including a display; and
a first processor configured to
receive a user operation for an image forming process via the user interface, and
control a reboot process for the first device independently of the image forming process,
the second device includes
a hardware device including at least a scanner or a printer;
a second processor configured to control the scanner or the printer to conduct the image forming process based on the received user operation, and
the first processor being configured to reboot the first device in asynchronization with the second device.

16. An image processing apparatus, comprising:
a hardware device including at least a scanner or a printer;
a sensor configured to detect a communication abnormality between the hardware device and a user operation device; and
a processor configured to
control the scanner or the printer to conduct an image forming process based on a received user operation by the user operation device,
send information corresponding to a status of executing the scanner or the printer, to the user operation device for rendering a screen accordance with the information,
continue to operate the scanner or the printer, upon rebooting of the user operation device,
stop sending the information upon the sensor detecting the abnormality, and
release the stop sending the information after the abnormality is eliminated.

17. The image processing system of claim 15, wherein
the first device further includes a switch used to input a command to execute a reboot of the first device, and
the first processor is configured to execute the reboot of the first device without rebooting the second device, upon an input of the command to execute a reboot of the first device being received in response to a user operation on the switch.

18. The image processing system of claim 15, wherein
the first device further includes a sensor to detect whether an abnormality occurs in the first device, and
the first processor is configured to automatically execute a reboot of the first device without rebooting the second device, when the sensor detects the abnormality.

19. The image processing system of claim 15, wherein while the first processor reboots the first device, the second processor is configured to continue to operate the hardware device.

20. The image processing apparatus according to claim 1, wherein the first device is rebooted without rebooting the second device.

21. The image processing apparatus according to claim 1, wherein the first device is rebooted independently of the second device when the first device is stalled or when a communication between the first device and the second device is disconnected.

\* \* \* \* \*